United States Patent [19]
Kanno et al.

[11] Patent Number: 5,173,347
[45] Date of Patent: Dec. 22, 1992

[54] POLYCARBONATE AND OPTICAL DISK THEREFROM

[75] Inventors: Tatsuya Kanno; Akihiro Izuka; Tsunehisa Katsuki; Ikuo Takahashi; Kenichi Sasaki, all of Himeji, Japan

[73] Assignee: Daicel Chemical Industries, Ltd., Osaka, Japan

[21] Appl. No.: 782,741

[22] Filed: Oct. 16, 1991

Related U.S. Application Data

[63] Continuation of Ser. No. 97,812, Sep. 16, 1987, abandoned.

[30] Foreign Application Priority Data

Sep. 29, 1986 [JP] Japan .................................. 61-230896
Sep. 29, 1986 [JP] Japan .................................. 61-230897
Oct. 2, 1986 [JP] Japan .................................. 61-233173

[51] Int. Cl.$^5$ .............................................. B32B 3/00
[52] U.S. Cl. ........................................ 428/64; 478/65; 478/412; 478/913; 369/288; 346/76 L; 346/135.1; 430/945
[58] Field of Search ................ 528/204; 428/64, 65, 428/412, 913; 369/288; 346/76 L, 135.1; 430/945

[56] References Cited

U.S. PATENT DOCUMENTS

| | | | |
|---|---|---|---|
| 4,585,722 | 4/1986 | Morinaka et al. | 430/964 |
| 4,680,374 | 7/1987 | Hasuo et al. | 528/204 |
| 4,701,770 | 10/1987 | Ito et al. | 346/135.1 |
| 4,707,431 | 11/1987 | Umehara | 430/271 |
| 4,719,171 | 1/1988 | Ikenaga et al. | 430/271 |
| 4,734,488 | 3/1988 | Havvo et al. | 528/204 |
| 4,745,029 | 5/1988 | Kambour | 428/412 |

*Primary Examiner*—B. Hamilton Hess
*Assistant Examiner*—Elizabeth Evans
*Attorney, Agent, or Firm*—Flynn, Thiel, Boutell & Tanis

[57] ABSTRACT

A new aromatic polycarbonate is obtained from (1) 2,2-bis(4-hydroxy-3-isopropylphenyl)propane, (2) 2,2-bis(4-hydroxyphenyl)propane and 2,2-bis(4-hydroxy-3-isopropylphenyl) propane or (3) 4,4'-dihydroxy-2,2,2-triphenylethane and 2,2-bis(4-hydroxy-3-isopropylphenyl)propane through a carbonate linkage and is useful as a starting material for an optical disk.

10 Claims, 6 Drawing Sheets

POLYCARBONATE AND OPTICAL DISK THEREFROM

This application is a continuation of U.S. Ser. No. 07/097,812, filed Sep. 16, 1987, now abandoned.

The present invention relates to a polycarbonate polymer usable in an optical information recording disk in which signals are recorded by means of a laser beam or recorded signals are read by utilizing the reflection or transmission of the laser beam.

PRIOR ART

A quite high recording density can be provided by an information recording/reproduction system of DRAW type or Erasable-DRAW-type in which a spot laser beam is applied to a disk to record signals on the disk by means of minute pits or the signals thus recorded by means of such pits are read by detecting the quantity of reflected or transmitted laser beam. Particularly in the system of Erasable-DRAW type, the record can be erased or written and images and sounds reproduced therefrom are excellent. Thus, it is expected to employ the system of Erasable-DRAW type broadly in the recording of images and sounds or reproduction of them and in the recording/reproduction of a large quantity of information. The disk used in the recording/reproduction system must be not only transparent so as to transmit the laser beam through the disk body but also optically uniform so as to minimize an error in the readout. When the laser beam is transmitted through the disk body, double refraction occurs due to mainly a thermal stress caused in the cooling and flowing steps of a resin in the molding to form the disk body, molecular orientation and residual stress caused by a change in volume around a glass transition point or temperature. A high optical non-uniformity due to the birefringence is a fatal defect of optical disks.

The birefringence of the disk which occurs due to mainly the thermal stress caused in the cooling and flowing steps of a resin in the molding to form the disk body, molecular orientation and residual stress, can be reduced considerably by selecting the molding conditions suitably. However, it still depends greatly on the intrinsic double refraction, i.e. photoelasticity constant, of the molded resin per se.

SUMMARY OF THE INVENTION

The birefringence can be represented as the product of the photoelastic coefficient and residual stress according to the following formula (1):

$$n_1 - n_2 = C(\sigma_1 - \sigma_2) \quad (1)$$

wherein:
$n_1 - n_2$ represents a birefringence,
$\sigma_1 - \sigma_2$ represents a residual stress, and
C represents a photoelastic coefficient It is apparent that the birefringence of the obtained disk can be reduced by reducing the photoelastic coefficient in the above formula (1) even when the molding conditions are unchanged. The inventors have found that a resin having a low photoelastic coefficient can be obtained without impairing the mechanical properties thereof by polymerizing 2,2-bis(4-hydroxy-3-isopropylphenyl)propane through a carbonate linkage. The present invention has been completed on the basis of this finding.

The invention provides an aromatic polycarbonate obtained from (1) 2,2-bis(4-hydroxy-3-isopropylphenyl)propane, (2) 2,2-bis(4-hydroxyphenyl)propane and 2,2-bis(4-hydroxy-3-isopropylphenyl)propane or (3) 4,4'-dihydroxy-2,2,2-triphenylethane and 2,2-bis(4-hydroxy-3-isopropylphenyl)propane through a carbonate linkage.

The aromatic polycarbonate preferably includes (1) a homopolymer of 2,2-bis(4-hydroxy-3-isopropylphenyl)propane, (2) a copolymer of 99 to 1 mole percent of 2,2-bis(4-hydroxyphenyl)propane and 1 to 99 mole percent of 2,2-bis(4-hydroxy-3-isopropylphenyl)propane and (3) a copolymer of 97 to 3 mole percent of 4,4'-dihydroxy-2,2,2-triphenylethane and 3 to 97 mole percent of 2,2-bis(4-hydroxy-3-isopropylphenyl)propane.

The polycarbonate of the invention is preferred to have a viscosity-average molecular weight of from 1,000 to 100,000, more preferably 10,000 to 100,000, most preferably 13,000 to 50,000.

The polycarbonate of the invention has a decreased photoelastic coefficient, called also as a photoelasticity constant, and therefore is prevented from birefringence, called also as double refraction.

The invention further provides an optical disk which comprises a substrate of the polycarbonate as defined above and a recording layer coated thereon. It is preferred in the optical disk that the polycarbonate has a viscosity-average molecular weight of 13,000 to 50,000.

DETAILED DESCRIPTION OF THE INVENTION

The polycarbonate of the invention will be explained below in reference to the preferable embodiments (1), (2) and (3).

The present invention relates to an aromatic polycarbonate polymer comprising 2,2-bis(4-hydroxy-3-isopropylphenyl)propane bonded through a carbonate linkage.

According to the present invention, an aromatic polycarbonate of the following formula (II):

comprising a bisphenol of the following formula (I):

polymerized through a carbonate linkage can be obtained.

The polymer of the present invention has a viscosity-average molecular weight of preferably 1,000 to 100,000 and more preferably 13,000 to 50,000. When this value is less than 1,000, the produced moldings are brittle and, on the contrary, when it exceeds 100,000, the melt fluidity is lowered to reduce the moldability thereof. Thus, the resin having a viscosity-average molecular weight of less than 1,000 or higher than 100,000 is unsuitable for use as the starting material for the optical disks.

The polycarbonate polymer of the present invention may comprise another carbonate comonomer as a second component. Such a carbonate component may be any compound capable of being bonded through the carbonate linkage. The amount (weight ratio) of the second component is not limited so far as it does not impair the physical properties of the product.

The polycarbonate polymer of the present invention can be prepared by the two following processes:

(1) Transesterification Process 2,2-Bis(4-hydroxy-3-isopropylphenyl)propane is reacted in the presence of diphenyl carbonate in an amount slightly larger than its stoichiometric amount and an ordinary carbonation catalyst at a temperature of about 160° to 180° C. under atmospheric pressure for about 30 min while an inert gas is introduced thereinto. Then, the pressure is reduced gradually over 2 h to finally 10 Torr at about 180 to 220° C. to complete the precondensation reaction at 220° C. Then the reaction is continued at 270° C. under 10 Torr for 30 min and then at 270° C. under 5 Torr for 20 min. Thereafter the postcondensation reaction is conducted at 270° C. under a reduced pressure of lower than 0.5 Torr, preferably 0.3 to 0.1 Torr, for 1.5 to 2.0 h.

Suitable carbonation catalysts used for forming the carbonate linkage include alkali metal and alkaline earth metal catalysts such as lithium, potassium, sodium, calcium and tin catalysts. Examples of them include lithium hydroxide, lithium carbonate, potassium borohydride, potassium hydrogenphosphate, sodium hydroxide, sodium borohydride, calcium hydride, dibutyltin oxide and stannous oxide. Among them, the potassium catalysts are preferred.

(2) Phosgene Process

A three-necked flask is provided with a stirrer, thermometer, gas-inlet tube and gas-outlet tube. 2,2-Bis(4-hydroxy-3-isopropylphenyl)propane is dissolved in pyridine and gaseous phosgene is introduced thereinto under vigorous stirring. This operation is conducted in a powerful draft chamber, since phosgene is virulent. A unit for decomposing excess phosgene into nonpoisonous compounds with a 10% aqueous sodium hydroxide solution is provided at an end of the outlet tube. Phosgene is introduced from a bomb into the flask through an empty gas washing bottle, a gas washing bottle containing paraffin (to count the number of bubbles) and an empty gas washing bottle sequentially. The gas inlet tube is inserted into the flask: and placed above the stirrer and the end thereof is widened like a funnel so that it would not be clogged by the formed pyridine salt.

As the gas is introduced into the flask, pyridine hydrochloride is precipitated and the reaction mixture becomes turbid. The reaction mixture is cooled with water to keep the reaction temperature below 30° C. As the condensation reaction proceeds, the reaction mixture becomes viscous. Phosgene is introduced thereinto until yellow color of phosgene/hydrogen chloride complex no more disappears. After completion of the reaction, methanol is added to precipitate the polymer, which is filtered and dried. The polycarbonate thus formed, being soluble in methylene chloride, pyridine, chloroform, tetrahydrofuran or the like, is dissolved therein and reprecipitated from methanol to purify the same.

The present invention relates to an aromatic polycarbonate copolymer comprising 99 to 1 molar %, preferably 90 to 10 molar %, of 2,2-bis(4-hydroxyphenyl)propane and 1 to 99 molar %, preferably 10 to molar %, of 2,2-bis(4-hydroxy-3-isopropylphenyl)propane bonded to each other through a carbonate linkage.

According to the present invention, an aromatic polycarbonate comprising bisphenols of the following formula (III) and (I) copolymerized through a carbonate linkage can be obtained:

(III)

(I)

The amount of the structural unit of the above formula (I) is 1 to 99 mole %. When it is less than 1 molar %, the photoelasticity constant of the obtained aromatic polycarbonate is substantially equal to that of a homopolycarbonate of the compound of the formula (III). On the contrary, when an amount of the structural unit of the above formula (I) exceeds 99 mole %, the glass transition point of the obtained aromatic polycarbonate is far lower than that of the homopolycarbonate of the compound of the formula (III).

The polycarbonate copolymer of the present invention may comprise a third component in addition to 2,2-bis(4-hydroxyphenyl)propane and 2,2-bis(4-hydroxy-3-isopropylphenyl)propane. The third component may be any compound capable of being bonded through the carbonate linkage. The amount (weight ratio) of the third component is not limited so far as it does not impair the physical properties of the product.

The present invention relates to an optical disk comprising an aromatic polycarbonate copolymer obtained from 97-3 mole % of (IV) 4,4'-dihydroxy-2,2,2-triphenylethane and 3-97 mol % of (I) 2,2-bis-(4-hydroxy-3-isopropylphenyl)propane through polycarbonate linking. According to this invention, there is provided an aromatic polycarbonate copolymer formed by the copolymerization of bisphenols represented by the following formulas (IV) and (I) below through polycarbonate linking.

(IV)

According to the invention, the amount of the constitutional unit represented by the formula (I) should be 10–90 mol %. With less than 10 mol %, the resulting aromatic polycarbonate has a photoelasticity constant similar to that of a homopolycarbonate composed of only the constitutional unit represented by the formula (IV). Conversely, with more than 90 mol %, the resulting aromatic polycarbonate has a considerably lower glass transition temp. than that of a homopolycarbonate composed of only the constitutional unit represented by the formula (IV).

The above shown copolymers (2) and (3) can be obtained in the same process as shown with the homopolymer (1), that is, the transesterification and the phosgene method. An aqueous solution of an alkali metal hydroxide such as sodium hydroxide may be used as solvent in the phosgene method.

The aromatic polycarbonate of the invention is useful as a starting material for an optical disk to record information with. The disk according to the invention includes the direct read after write type (DRAW) and the erasable direct read after write type (Erasable DRAW) and serves to record signals with a laser beam and read recorded signals with reflection or transmission of a laser beam.

From the practical point of view, the polycarbonate is used as a supporting substrate for a recording layer. A disk of it is covered with a recording layer such as evaporated metals to form a recording medium. Two recording disks obtained this way are assembled into one body, for example by bonding with an adhesive or melting and bonding with the ultrasonic waves, through a spacer so that the two recording surfaces may face each other. The recording layer may be further covered with a protective layer.

The polycarbonate copolymer of the present invention having a low photoelasticity constant can be used as a starting material for optical information recording disks wherein signals are recorded by a laser beam or recorded signals are read by utilizing the reflection or transmission of the laser beam.

EXAMPLE

The invention will be illustrated below in reference to examples of the polycarbonate and the optical disk. Example 1 to 18 relate to the polycarbonate (2), Examples 19 and 20 relate to the polycarbonate (1) and Examples 21 and 22 relate to the polycarbonate (3).

In the examples, parts and percentages are given by weight.

EXAMPLE 1

Figure 1:
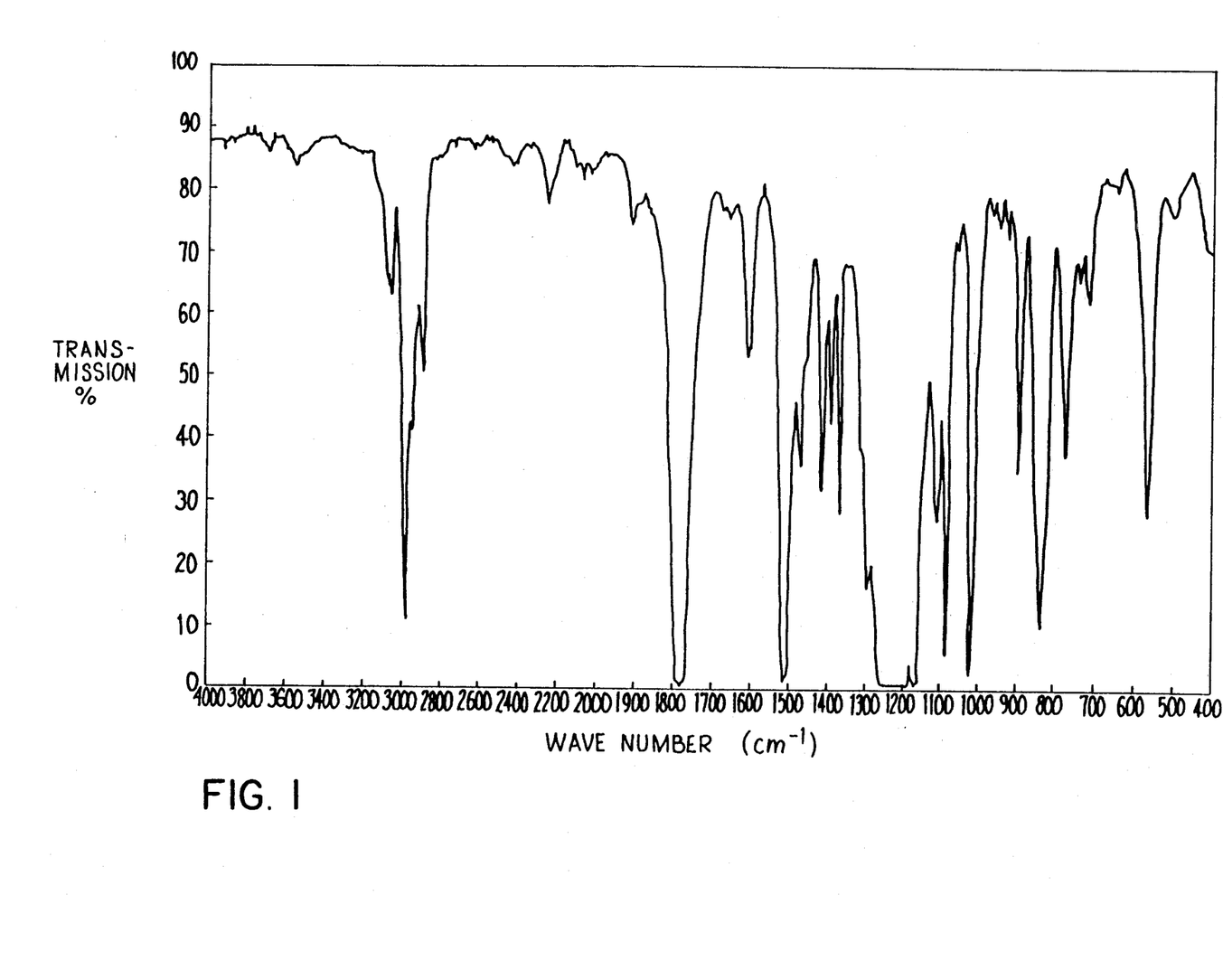
FIGS. 1, 3 and 5 show IR spectra of the copolymers of the present invention prepared in Examples 1, 9 and 17, respectively.
Figure 2:
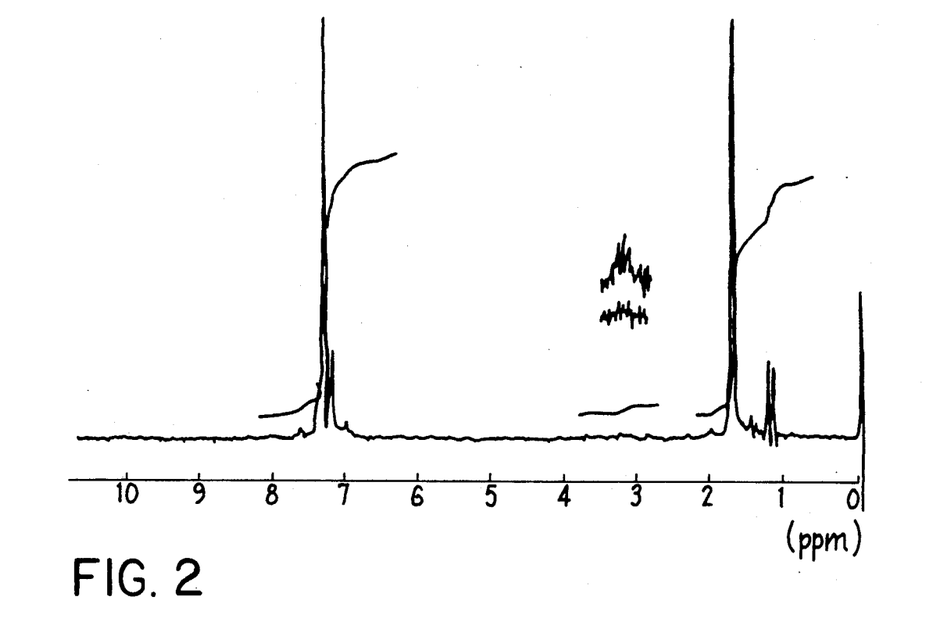
FIGS. 2, 4 and 6 show NMR spectra of the copolymers of the present invention prepared in Examples 1, 9 and 17, respectively.

247 parts (90 molar %) of 2,2-bis(4-hydroxyphenyl)propane, 37 parts (10 molar %) of 2,2-bis(4-hydroxy-3-isopropylphenyl)propane and 264 parts of diphenyl carbonate were placed in a 3-l three-necked flask. After repeating degassing and nitrogen purge five times, the mixture was melted at 160° C. in a silicone bath while nitrogen was introduced thereinto. A solution of potassium borohydride (carbonation catalyst) in phenol prepared previously was added to the melt in an amount of $10^{-3}$ molar % based or the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 30 min. The temperature was elevated slowly to 220° C. and the reaction was conducted for 60 min to distill phenol in an amount of 80 % based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 32,000. In its IR spectrum, a characteristic absorption of a carbonate bond was observed at 1760 to 1810 cm$^{-1}$ (FIG. 1). In its $^1$H-NMR spectrum, absorptions due to hydrogen in the methyl group of an isopropyl group at 1.2 ppm, hydrogen in the methyl group of propane at 1.7 ppm, hydrogen in the methine group of an isopropyl group at 3.2 ppm and a phenyl group at 7.2 to 7.5 ppm were observed (FIG. 2). From the results of the determination with DSC (differential scanning calorimeter; Perkin-Elmer 2C), it was found that the glass transition point Tg was 139° C. The photoelasticity constant C was 74 Brewsters ($10^{-12}$ m$^2$/N). From the integrated value of the NMR chart, it was confirmed that the polymer was a polycarbonate copolymer comprising 2,2-bis(4-hydroxyphenyl)propane and 2,2-bis(4-hydroxy-3-isopropylphenyl)propane in a ratio of 9:1.

The devices used in the measurement were an IR spectrometer (IR-810; a product of Nippon Bunkô Co.), a $^1$H-NMR device (JNM-MH-100; a product of JEOL, Ltd.) and a DSC [(differential scanning calorimeter (Perkin-Elmer 2C)]. The photoelasticity constant was determined with a device made by the present inventors. The photoelasticity constant was determined by applying various tensile stresses to test pieces (50 mm × 10 mm × 1 mm) lengthwise, measuring the double refraction, putting the value in the above-mentioned formula (1) and determining the photoelasticity constant from the gradient. The photoelasticity constant of 2,2-bis(4-hydroxyphenyl)propane polycarbonate was 82 Brewsters ($10^{-12}$ m$^2$/N).

EXAMPLE 2

A three-necked flask was provided with a stirrer, thermometer, gas-inlet tube and gas-outlet tube. 247 parts (90 molar %) of 2,2-bis(4-hydroxyphenyl) propane and 37 parts (10 molar %) of 2,2-bis(4-hydroxy-3-isopropylphenyl)propane were dissolved in a 10% aqueous sodium hydroxide solution. Dichloromethane was added to the solution thus prepared. Phosgene gas was introduced thereinto under vigorous stirring. Phosgene was introduced from a bomb into the flask through an empty gas washing bottle, a gas washing bottle containing water and an empty gas washing bottle sequentially. The reaction temperature was kept below 25° C. with water during the introduction of gaseous phosgene. As the condensation reaction proceeded, the solution became viscous. Phosgene was introduced thereinto until yellow color of phosgene/hydrogen chloride complex no more disappeared. After completion of the reaction, the reaction solution was poured into methanol, the mixture was filtered and the filtration residue was washed with water. This procedure was repeated. The polycarbonate thus formed in the form of a solution in dichloromethane was reprecipitated from methanol to purify the same.

After the purification followed by drying, the solution viscosity of the product was determined using dichloromethane as the solvent at 20° C. The viscosity-average molecular weight $\overline{M}v$ calculated from the solution viscosity was 35,000. From the fact that the results similar to those obtained in Example 1 were obtained by the instrumental analysis conducted in the same manner as in Example 1, the formed polymer was identified with a polycarbonate copolymer comprising 2,2-bis-(4-hydroxyphenyl)propane and 2,2-bis(4-hydroxy-3-isopropylphenyl)propane in a ratio of 9:1.

EXAMPLE 3

219 parts (80 molar %) of 2,2-bis-(4-hydroxyphenyl)propane, 75 parts (20 molar %) of 2,2-bis(4-hydroxy-3-isopropylphenyl)propane and 264 parts of diphenyl carbonate were placed in a 3-l three-necked flask. After repeating degassing and nitrogen purge five times, the mixture was melted at 160° C. in a silicone bath while nitrogen was introduced thereinto. A solution of potassium borohydride (carbonation catalyst) in phenol prepared previously was added to the melt in an amount of $10^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 30 min. The temperature was elevated slowly to 220° C. and the reaction was conducted for 60 min. The amount of phenol distilled until this step was 80% based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 29,000. In its IR spectrum, a characteristic absorption of a carbonate bond was observed at 1760 to 1810 cm$^{-1}$. In its $^1$H-NMR spectrum, absorption due to hydrogen in the methyl group of an isopropyl group at 1.2 ppm, hydrogen in the methyl group of propane at 1.7 ppm, hydrogen in the methine group of an isopropyl group at 3.2 ppm and a phenyl group at 7.0 to 7.3 ppm were observed. From the results of the determination with DSC, it was found that the glass transition point Tg was 130° C. The photoelasticity constant C was 64 Brewsters ($10^{-12}$ m$^2$/N). From the integrated value of the NMR chart, it was confirmed that the polymer was a polycarbonate copolymer comprising 2,2-bis(4-hydroxyphenyl)propane and 2,2-bis(4-hydroxy-3-isopropylphenyl)propane in a ratio of 4:1.

EXAMPLE 4

A three-necked flask was provided with a stirrer, thermometer, gas-inlet tube and gas-outlet tube. 219 parts (80 molar %) of 2,2-bis(4-hydroxyphenyl)propane and 75 parts (20 molar %) of 2,2-bis(4-hydroxy-3-isopropylphenyl)propane were dissolved in a 10% aqueous sodium hydroxide solution. Dichloromethane was added to the solution thus prepared. Phosgene gas was introduced thereinto under vigorous stirring. Phosgene was introduced from a bomb into the flask through an empty gas washing bottle, a gas washing bottle containing water and an empty gas washing bottle sequentially. The reaction temperature was kept below 25° C. with water during the introduction of gaseous phosgene. As the condensation reaction proceeded, the solution became viscous. Phosgene was introduced thereinto until yellow color of phosgene/hydrogen chloride complex no more disappeared. After completion of the reaction, the reaction solution was poured into methanol, the mixture was filtered and the filtration residue was washed with water. This procedure was repeated. The polycarbonate thus formed in the form of a solution in dichloromethane was reprecipitated from methanol to purify the same.

After the purification followed by drying, the solution viscosity of the product was determined using dichloromethane as the solvent at 20° C. The viscosity-average molecular weight $\overline{M}v$ calculated from the solution viscosity was 33,000. From the fact that the results similar to those obtained in Example 3 were obtained by the instrumental analysis conducted in the same manner as in Example 3, the formed polymer was identified with a polycarbonate copolymer comprising 2,2-bis-(4-hydroxyphenyl)propane and 2,2-bis(4-hydroxy-3-isopropylphenyl)propane in a ratio of 4:1.

EXAMPLE 5

192 parts (70 molar %) of 2,2-bis-(4-hydroxyphenyl)propane, 112 parts (30 molar %) of 2,2-bis(4-hydroxy-3-isopropylphenyl)propane and 264 parts of diphenyl carbonate were placed in a 3-l three-necked flask. After repeating degassing and nitrogen purge five times, the mixture was melted at 160° C. in a silicone bath while nitrogen was introduced thereinto. A solution of potassium borohydride (carbonation catalyst) in phenol prepared previously was added to the melt in an amount of $10^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 30 min. The temperature was elevated slowly to 220° C. and the reaction was conducted for 60 min. The amount of phenol distilled until this step was 80% based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 30,000. In its IR spectrum, a characteristic absorption of a carbonate bond was observed at 1760 to 1810 cm$^{-1}$. In its $^1$H-NMR spectrum, absorption due to hydrogen in the methyl group of an isopropyl group at 1.2 ppm, hydrogen in the methyl group of a propane at 1.7 ppm, hydrogen in the methine group of an isopropyl group at 3.2 ppm and a phenyl group at 7.18 to 7.5 ppm were observed. From the results of the determination with DSC, it was found that the glass transition point Tg was 121° C. The photoelasticity constant C was 61 Brewsters ($10^{-12}$m$^2$/N). From the integrated value of the NMR chart, it was confirmed that the polymer was a polycarbonate copolymer comprising 2,2-bis(4-hydroxyphenyl)propane and 2,2-bis(4-hydroxy-3-isopropylphenyl)propane in a ratio of 7:3.

EXAMPLE 6

A three-necked flask was provided with a stirrer, thermometer, gas-inlet tube and gas-outlet tube. 192 parts (70 molar %) of 2,2-bis(4-hydroxyphenyl)propane and 122 parts (30 molar %) of 2,2-bis(4-hydroxy-3-isopropylphenyl)propane were dissolved in a 10% aqueous sodium hydroxide solution. Dichloromethane was added to the solution thus prepared. Gaseous phosgene was introduced thereinto under vigorous stirring. Phosgene was introduced from a bomb into the flask through an empty gas washing bottle, a gas washing bottle containing water and an empty gas washing bottle sequentially. The reaction temperature was kept below 25° C. with water during the introduction of gaseous phosgene As the condensation reaction proceeded, the solution became viscous. Phosgene was introduced thereinto until yellow color of phosgene/hydrogen chloride complex no more disappeared. After completion of the reaction, the reaction solution was poured into methanol, the mixture was filtered and the filtration residue was washed with water. This procedure was repeated. The polycarbonate thus formed in the form of a solution in dichloromethane was reprecipitated from methanol to purify the same.

After the purification followed by drying, the solution viscosity of the product was determined using dichloromethane as the solvent at 20° C. The viscosity-average molecular weight $\overline{M}v$ calculated from the solution viscosity was 35,000. From the fact that the results similar to those obtained in Example 5 were obtained by the instrumental analysis conducted in the same manner as in Example 5, the formed polymer was identified with a polycarbonate copolymer comprising 2,2-bis-(4-hydroxyphenyl)propane and 2,2-bis(4-hydroxy-3-isopropylphenyl)propane in a ratio of 7:3.

EXAMPLE 7

164 parts (60 molar %) of 2,2-bis-(4-hydroxyphenyl)-propane, 150 parts (40 molar %) of 2,2-bis(4-hydroxy-3-isopropylphenyl)propane and 264 parts of diphenyl carbonate were placed in a 3-l three-necked flask. After repeating degassing and nitrogen purge five times, the mixture was melted at 160° C. in a silicone bath while nitrogen was introduced thereinto. A solution of potassium borohydride (carbonation catalyst) in phenol prepared previously was added to the melt in an amount of 10$^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 60 min. The temperature was elevated slowly to 220° C. and the reaction was conducted for 60 min. The amount of phenol distilled until this step was 80% based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 29,000. In its IR spectrum, a characteristic absorption of a carbonate bond was observed at 1760 to 1810 cm$^{-1}$. In its $^1$H-NMR spectrum, absorption due to hydrogen in the methyl group of an isopropyl group at 1.2 ppm, hydrogen in the methyl group of propane at 1.7 ppm, hydrogen in the methine group of an isopropyl group at 3.2 ppm and a phenyl group at 7.2 to 7.4 ppm were observed. From the results of the determination with DSC, it was found that the glass transition point Tg was 114° C. The photoelasticity constant C was 56 Brewsters ($10^{-12}$ m$^2$/N). From the integrated value of the NMR chart, it was confirmed that the polymer was a polycarbonate copolymer comprising 2,2-bis(4-hydroxyphenyl)propane and 2,2-bis(4-hydroxy-3-isopropylphenyl) propane in a ratio of 3:2.

EXAMPLE 8

A three-necked flask was provided with a stirrer, thermometer, gas-inlet tube and gas-outlet tube. 164 parts (60 molar %) of 2,2-bis(4-hydroxyphenyl)propane and 150 parts (40 molar %) of 2,2-bis(4-hydroxy-3-isopropylphenyl)propane were dissolved in a 10% aqueous sodium hydroxide solution. Dichloromethane was added to the solution thus prepared Gaseous phosgene was introduced thereinto under vigorous stirring. Phosgene was introduced from a bomb into the flask through an empty gas washing bottle; a gas washing bottle containing water and an empty gas washing bottle sequentially. The reaction temperature was kept below 25° C.

with water during the introduction of gaseous phosgene. As the condensation reaction proceeded, the solution became viscous. Phosgene was introduced thereinto until yellow color of phosgene/hydrogen chloride complex no more disappeared. After completion of the reaction, the reaction solution was poured into methanol, the mixture was filtered and the filtration residue was washed with water. This procedure was repeated. The polycarbonate thus formed in the form of a solution in dichloromethane was reprecipitated from methanol to purify the same.

After the purification followed by drying, the solution viscosity of the product was determined using dichloromethane as the solvent at 20° C. The viscosity-average molecular weight $\overline{M}v$ calculated from the solution viscosity was 31,000. From the fact that the results similar to those obtained in Example 7 were obtained by the instrumental analysis conducted in the same manner as in Example 7, the formed polymer was identified with a polycarbonate copolymer comprising 2,2-bis-(4-hydroxyphenyl)propane and 2,2-bis(4-hydroxy-3-isopropylphenyl)propane in a ratio of 3:2.

EXAMPLE 9

Figure 3:
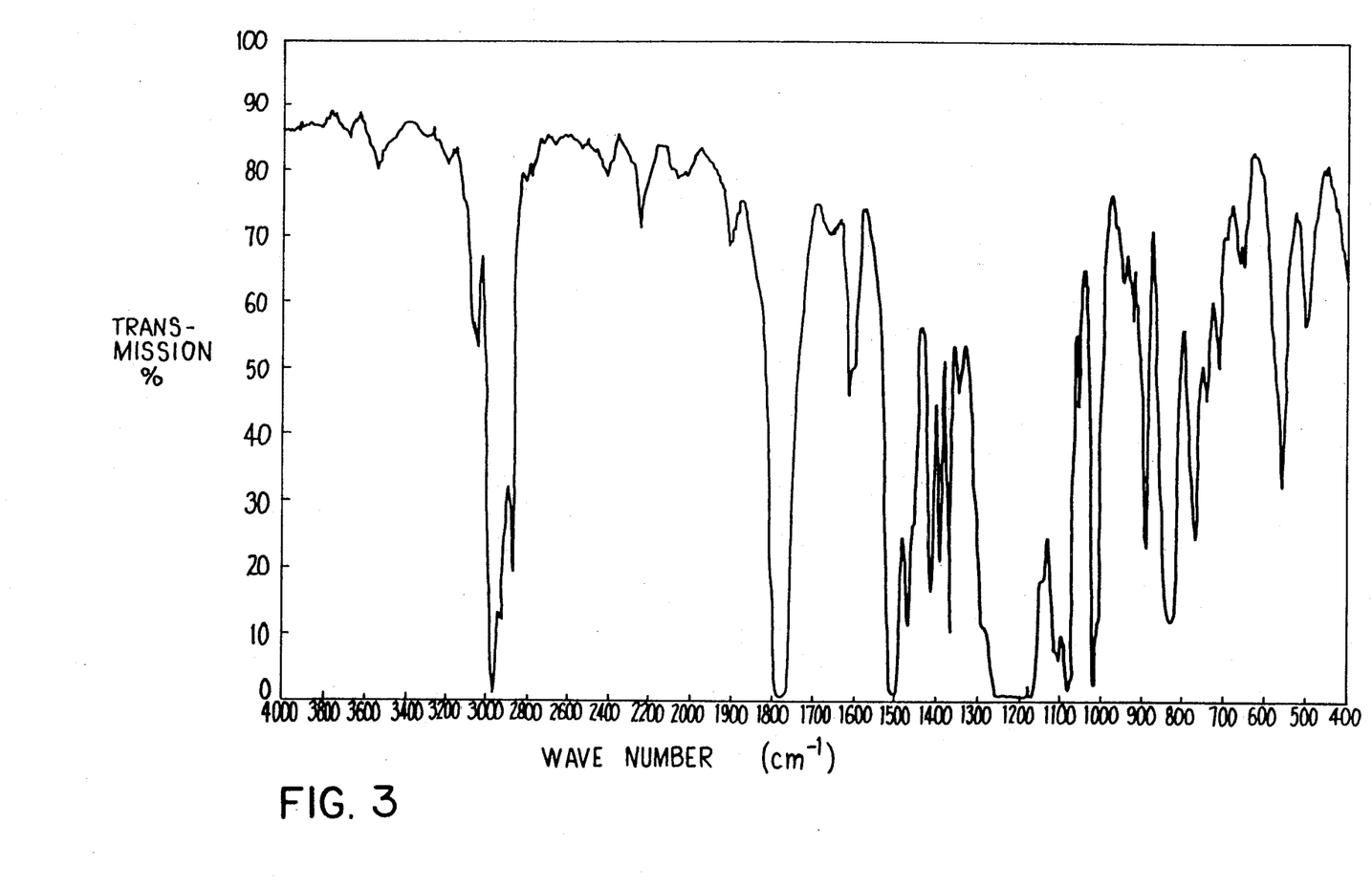
Figure 4:
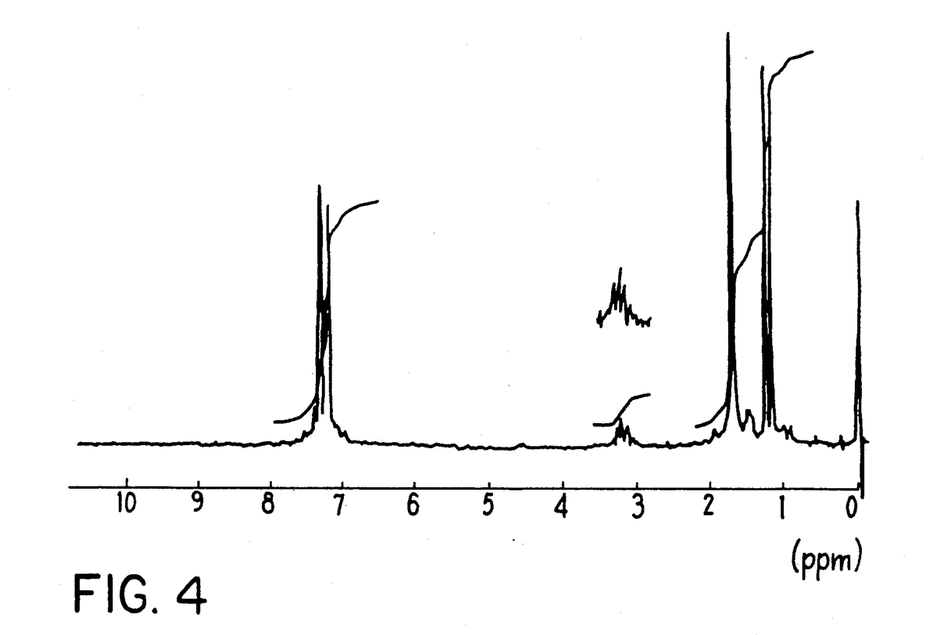

137 parts (50 molar %) of 2,2-bis-(4-hydroxyphenyl)propane, 187 parts (50 molar %) of 2,2-bis(4-hydroxy-3-isopropylphenyl)propane and 264 parts of diphenyl carbonate were placed in a 3-l three-necked flask. After repeating degassing and nitrogen purge five times, the mixture was melted at 160° C. in a silicone bath while nitrogen was introduced thereinto. A solution of potassium borohydride (carbonation catalyst) in phenol prepared previously was added to the melt in an amount of $10^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 60 min. The temperature was elevated slowly to 220° C. and the reaction was conducted for 60 min. The amount of phenol distilled until this step was 80% based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 27,000. In its IR spectrum, a characteristic absorption of a carbonate bond was observed at 1760 to 1810 cm$^{-1}$ (FIG. 3). In its $^1$H-NMR spectrum, absorption due to hydrogen in the methyl group of an isopropyl group at 1.2 ppm, hydrogen in the methyl group of propane at 1.7 ppm, hydrogen in the methine group of an isopropyl group at 3.2 ppm and a phenyl group at 7.1 to 7.6 ppm were observed (FIG. 4). From the results of the determination with DSC, it was understood that the glass transition point Tg was 107° C. The photoelasticity constant C was 55 Brewsters ($10^{-12}$ m$^2$/N) From the integrated value of the NMR chart, it was confirmed that the polymer was a polycarbonate copolymer comprising 2,2-bis(4-hydroxyphenyl)propane and 2,2-bis(4-hydroxy-3-isopropylphenyl)propane in a ratio of 1:1.

EXAMPLE 10

A three-necked flask was provided with a stirrer, thermometer, gas-inlet tube and gas-outlet tube. 137 parts (50 molar %) of 2,2-bis(4-hydroxyphenyl)propane and 187 parts (50 molar %) of 2,2-bis(4-hydroxy-3-isopropylphenyl)propane were dissolved in a 10% aqueous sodium hydroxide solution. Dichloromethane was added to the solution thus prepared. Gaseous phosgene was introduced thereinto under vigorous stirring. Phosgene was introduced from a bomb into the flask through an empty gas washing bottle, a gas washing bottle containing water and an empty gas washing bottle sequentially. The reaction temperature was kept below 25° C. with water during the introduction of gaseous phosgene. As the condensation reaction proceeded, the solution became viscous. Phosgene was introduced thereinto until yellow color of phosgene/hydrogen chloride complex no more disappeared. After completion of the reaction, the reaction solution was poured into methanol, the mixture was filtered and the filtration residue was washed with water. This procedure was repeated. The polycarbonate thus formed in the form of a solution in dichloromethane was reprecipitated from methanol to purify the same.

After the purification followed by drying, the solution viscosity of the product was determined using dichloromethane as the solvent at 20° C. The viscosity-average molecular weight $\overline{M}v$ calculated from the solution viscosity was 29,000. From the fact that the results similar to those obtained in Example 9 were obtained by the instrumental analysis conducted in the same manner as in Example 9, the formed polymer was identified with a polycarbonate copolymer comprising 2,2-bis-(4-hydroxyphenyl)propane and 2,2-bis(4-hydroxy-3-isopropylphenyl)propane in a ratio of 1:1.

EXAMPLE 11

110 parts (40 molar %) of 2,2-bis-(4-hydroxyphenyl)propane, 225 parts (60 molar %) of 2,2-bis(4-hydroxy-3-isopropylphenyl)propane and 264 parts of diphenyl carbonate were placed in a 3-l three-necked flask. After repeating degassing and nitrogen purge five times, the mixture was melted at 160° C. in a silicone bath while nitrogen was introduced thereinto. A solution of potassium borohydride (carbonation catalyst) in phenol prepared previously was added to the melt in an amount of $10^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 60 min. The temperature was elevated slowly to 220° C. and the reaction was conducted for 60 min. The amount of phenol distilled until this step was 80% based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step, Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 28,000. In its IR spectrum, a characteristic absorption of a carbonate bond was observed at 1760 to 1810 cm$^{-1}$. In its $^1$H-NMR spectrum, absorption due to hydrogen in the methyl group of an isopropyl group at 1.2 ppm, hydrogen in the methyl group of propane at 1.7 ppm, hydrogen in the methine group of an isopropyl group at 3.2 ppm and a phenyl group at 7.2 to 7.5 ppm were observed. From the results of the determination with DSC, it was found that the glass transition point Tg was 103° C. The photoelasticity constant C was 49 Brewsters ($10^{-12}$ m$^2$/N). From the integrated value of the NMR chart, it was confirmed that the polymer was a polycarbonate copolymer comprising 2,2-bis(4-hydroxyphenyl)propane and 2,2-bis(4-hydroxy-3-isopropylphenyl)propane in a ratio of 2:3.

EXAMPLE 12

A three-necked flask was provided with a stirrer, thermometer, gas-inlet tube and gas-outlet tube. 110 parts (40 molar %) of 2,2-bis(4-hydroxyphenyl)propane and 225 parts (60 molar %) of 2,2-bis(4-hydroxy-3-isopropylphenyl)propane were dissolved in a 10% aqueous sodium hydroxide solution. Dichloromethane was added to the solution thus prepared. Gaseous phosgene was introduced thereinto under vigorous stirring. Phosgene was introduced from a bomb into the flask through an empty gas washing bottle, a gas washing bottle containing water and an empty gas washing bottle sequentially. The reaction temperature was kept below 25° C with water during the introduction of gaseous phosgene. As the condensation reaction proceeded, the solution became viscous Phosgene was introduced thereinto until yellow color of phosgene/hydrogen chloride complex no more disappeared. After completion of the reaction, the reaction solution was poured into methanol, the mixture was filtered and the filtration residue was washed with water. This procedure was repeated. The polycarbonate thus formed in the form of a solution in dichloromethane was reprecipitated from methanol to purify the same.

After the purification followed by drying, the solution viscosity of the product was determined using dichloromethane as the solvent at 20° C. The viscosity-average molecular weight $\overline{M}v$ calculated from the solution viscosity was 31,000. From the fact that the results similar to those obtained in Example 11 were obtained by the instrumental analysis conducted in the same manner as in Example 11, the formed polymer was identified with a polycarbonate copolymer comprising 2,2-bis-(4-hydroxyphenyl)propane and 2,2-bis(4-hydroxy-3-isopropylphenyl)propane in a ratio of 2:3.

EXAMPLE 13

82 parts (30 molar %) of 2,2-bis-(4-hydroxyphenyl)propane, 262 parts (70 molar %) of 2,2-bis(4-hydroxy-3-isopropylphenyl)propane and 264 parts of diphenyl carbonate were placed in a 3-l three-necked flask. After repeating degassing and nitrogen purge five times, the mixture was melted at 160° C. in a silicone bath while nitrogen was introduced thereinto. A solution of potassium borohydride (carbonation catalyst) in phenol prepared previously was added to the melt in an amount of $10^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 60 min. The temperature was elevated slowly to 220° C. and the reaction was conducted for 60 min. The amount of phenol distilled until this step was 80% based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 25,000. In its IR spectrum, a characteristic absorption of a carbonate bond was observed at 1760 to 1810 cm$^{-1}$. In its $^1$H-NMR spectrum, absorption due to hydrogen in the methyl group of an isopropyl group at 1.2 ppm, hydrogen in the methyl group of propane at 1.7 ppm, hydrogen in the methine group of an isopropyl group at 3.2 ppm and a phenyl group at 7.1 to 7.5 ppm were observed. From the results of the determination with DSC, it was found that the glass transition point Tg was 93° C. The photoelasticity constant C was 41 Brewsters ($10^{-12}$ m$^2$/N). From the integrated value of the NMR chart, it was confirmed that the polymer was a polycarbonate copolymer comprising 2,2-bis(4-hydroxyphenyl)propane and 2,2-bis(4-hydroxy-3-isopropylphenyl)propane in a ratio of 3:7.

EXAMPLE 14

A three-neck flasked was provided with a stirrer, thermometer, gas-inlet tube and gas-outlet tube. 82 parts (30 molar %) of 2,2-bis(4-hydroxyphenyl)propane and 262 parts (70 molar %) of 2,2-bis(4-hydroxy-3-isopropylphenyl)propane were dissolved in a 10% aqueous sodium hydroxide solution. Dichloromethane was added to the solution thus prepared. Gaseous phosgene was introduced thereinto under vigorous stirring. Phosgene was introduced from a bomb into the flask through an empty gas washing bottle, a gas washing bottle containing water and an empty gas washing bottle sequentially. The reaction temperature was kept below 25° C. with water during the introduction of gaseous phosgene. As the condensation reaction proceeded, the solution became viscous. Phosgene was introduced thereinto until yellow color of phosgene/hydrogen chloride complex no more disappeared. After completion of the reaction, the reaction solution was poured into methanol, the mixture was filtered and the filtration residue was washed with water. This procedure was repeated. The polycarbonate thus formed in the form of a solution in dichloromethane was reprecipitated from methanol to purify the same.

After the purification followed by drying, the solution viscosity of the product was determined using dichloromethane as the solvent at 20° C. The viscosity-average molecular weight $\overline{M}v$ calculated from the solution viscosity was 29,000. From the fact that the results similar to those obtained in Example 13 were obtained by the instrumental analysis conducted in the same manner as in Example 13, the formed polymer was identified with a polycarbonate copolymer comprising 2,2-bis-(4-hydroxyphenyl)propane and 2,2-bis(4-hydroxy-3-isopropylphenyl)propane in a ratio of 3:7.

EXAMPLE 15

55 parts (20 molar %) of 2,2-bis-(4-hydroxyphenyl)-propane, 300 parts (80 molar %) of 2,2-bis(4-hydroxy-3-isopropylphenyl)propane and 264 parts of diphenyl carbonate were placed in a 3-l three-necked flask. After repeating degassing and nitrogen purge five times, the mixture was melted at 160° C. in a silicone bath while nitrogen was introduced thereinto. A solution of potassium borohydride (carbonation catalyst) in phenol prepared previously was added to the melt in an amount of $10^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 60 min. The temperature was elevated slowly to 220° C. and the reaction was conducted for 60 min. The amount of phenol distilled until this step was 80% based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 27,000. In its IR spectrum, a characteristic absorption of a carbonate bond was observed at 1760 to 1810 cm$^{-1}$. In its $^1$H-NMR spectrum, absorption due to hydrogen in the methyl group of an isopropyl group at 1.2 ppm, hydrogen in the methyl group of propane at 1.7 ppm, hydrogen in the methine group of an isopropyl group at 3.2 ppm and a phenyl group at 7.0 to 7.3 ppm were observed. From the results of the determination with DSC, it was found that the glass transition point Tg was 90° C. The photoelasticity constant C was 38 Brewsters ($10^{-12}$ m$^2$/N). From the integrated value of the NMR chart, it was confirmed that the polymer was a polycarbonate copolymer comprising 2,2-bis(4-hydroxyphenyl)propane and 2,2-bis(4-hydroxy-3-isopropylphenyl)propane in a ratio of 1:4.

EXAMPLE 16

A three-necked flask was provided with a stirrer, thermometer, gas-inlet tube and gas-outlet tube. 55 parts (20 molar %) of 2,2-bis(4-hydroxyphenyl)propane and 300 parts (80 molar %) of 2,2-bis(4-hydroxy-3-isopropylphenyl)propane were dissolved in a 10% aqueous sodium hydroxide solution. Dichloromethane was added to the solution thus prepared. Gaseous phosgene was introduced thereinto under vigorous stirring. Phosgene was introduced from a bomb into the flask through an empty gas washing bottle, a gas washing bottle containing water and an empty gas washing bottle sequentially. The reaction temperature was kept below 25° C. with water during the introduction of gaseous phosgene. As the condensation reaction proceeded, the solution became viscous Phosgene was introduced thereinto until yellow color of phosgene/hydrogen chloride complex no more disappeared. After completion of the reaction, the reaction solution was poured into methanol, the mixture was filtered and the filtration residue was washed with water. This procedure was repeated. The polycarbonate thus formed in the form of a solution in dichloromethane was reprecipitated from methanol to purify the same.

After the purification followed by drying, the solution viscosity of the product was determined using dichloromethane as the solvent at 20° C. The viscosity-average molecular weight $\overline{M}v$ calculated from the solution viscosity was 29,000. From the fact that the results similar to those obtained in Example 15 were obtained by the instrumental analysis conducted in the same manner as in Example 15, the formed polymer was identified with a polycarbonate copolymer comprising 2,2-bis-(4-hydroxyphenyl)propane and 2,2-bis(4-hydroxy-3-isopropylphenyl)propane in a ratio of 1:4.

EXAMPLE 17

Figure 5:
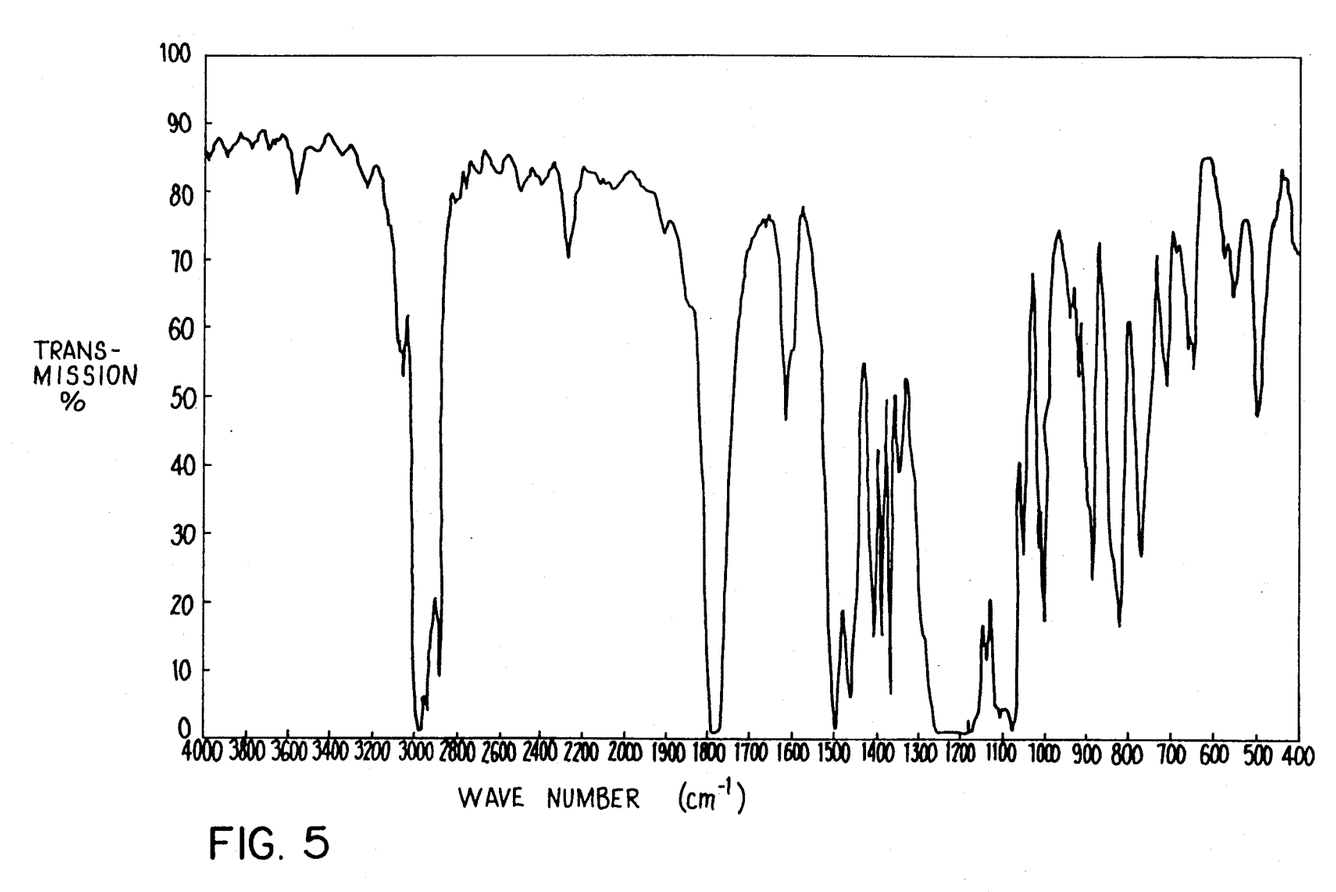
Figure 6:
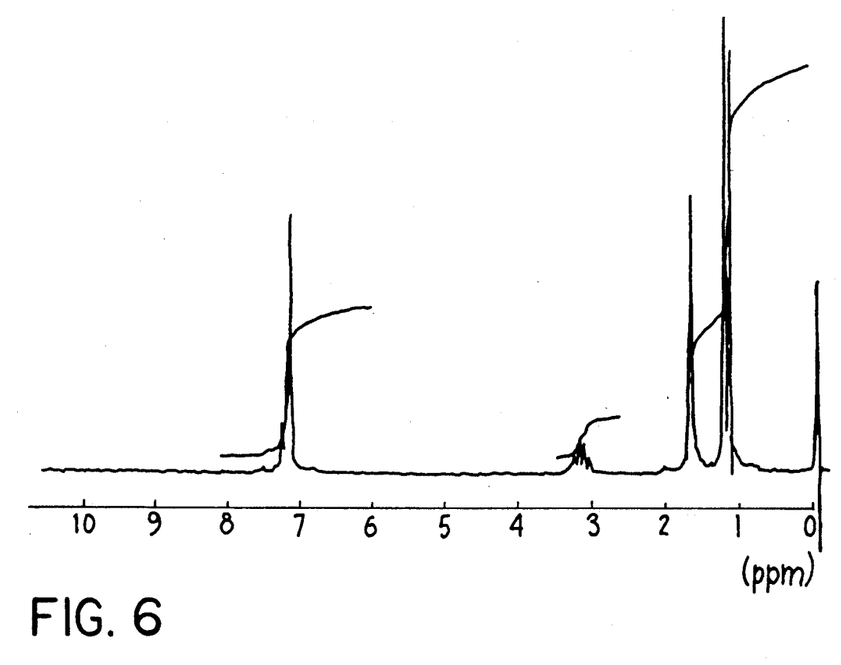

27 parts (10 molar %) of 2,2-bis-(4-hydroxyphenyl)-propane, 337 parts (90 molar %) of 2,2-bis(4-hydroxy-3-isopropylphenyl)propane and 264 parts of diphenyl carbonate were placed in a 3-l three-necked flask. After repeating degassing and nitrogen purge five times, the mixture was melted at 160° C. in a silicone bath while nitrogen was introduced thereinto. A solution of potassium borohydride (carbonation catalyst) in phenol prepared previously was added to the melt in an amount of $10^{-3}$ molar % based on the total amount of the bisphenol fed. After aging under stirring at 160° C. in a nitrogen atmosphere for 30 min, the pressure was reduced to 100 Torr at that temperature and the mixture was stirred for 30 min. Further the pressure was reduced to 50 Torr at that temperature and the reaction was continued for additional 60 min. The temperature was elevated slowly to 220° C. and the reaction was conducted for 60 min. The amount of phenol distilled until this step was 80% based on a theoretical amount. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. The precondensation was thus completed and a nearly theoretical amount of phenol was distilled until this step. Thereafter the postcondensation reaction was conducted at that temperature under 0.1 to 0.3 Torr for 2 h. The resulting polymer was taken out and cooled in a nitrogen atmosphere and its solution viscosity was determined using dichloromethane as the solvent at 20° C. The viscosity-average molecular weight $\overline{M}v$ calculated from the solution viscosity was 25,000. In its IR spectrum, a characteristic absorption of a carbonate bond was observed at 1760 to 1810 cm$^{-1}$ (FIG. 5). In its $^1$H-NMR spectrum, absorption due to hydrogen in the methyl group of an isopropyl group at 1.2 ppm, hydrogen in the methyl group of propane at 1.7 ppm, hydrogen in the methine group of an isopropyl group at 3.2 ppm and a phenyl group at 7.2 to 7.4 ppm were observed (FIG. 6). From the results of the determination with DSC, it was found that the glass transition point Tg was 85° C. The photoelasticity constant C was 35 Brewsters ($10^{-12}$ m²/N). From the integrated value of the NMR chart, it was confirmed that the polymer was a polycarbonate copolymer comprising 2,2-bis(4-hydroxyphenyl)propane and 2,2-bis(4-hydroxy-3-isopropylphenyl)propane in a ratio of 1:9.

EXAMPLE 18

A three-necked flask was provided with a stirrer, thermometer, gas-inlet tube and gas-outlet tube. 27 parts (10 molar %) of 2,2-bis(4-hydroxyphenyl)propane and 337 parts (90 molar %) of 2,2-bis(4-hydroxy-3-isopropylphenyl)propane were dissolved in a 10% aqueous sodium hydroxide solution. Dichloromethane was added to the solution thus prepared. Gaseous phosgene was introduced thereinto under vigorous stirring. Phosgene was introduced from a bomb into the flask through an empty gas washing bottle, a gas washing bottle containing water and an empty gas washing bottle sequentially. The reaction temperature was kept below 25° C. with water during the introduction of gaseous phosgene. As the condensation reaction proceeded, the solution became viscous. Phosgene was introduced thereinto until yellow color of phosgene/hydrogen chloride complex no more disappeared. After completion of the reaction, the reaction solution was poured into methanol, the mixture was filtered and the filtration residue was washed with water. This procedure was repeated. The polycarbonate thus formed in the form of a solution in dichloromethane was reprecipitated from methanol to purify the same.

After the purification followed by drying, the solution viscosity of the product was determined using dichloromethane as the solvent at 20° C. The viscosity-average molecular weight $\overline{M}v$ calculated from the solution viscosity was 28,000. From the fact that the results similar to those obtained in Example 17 were obtained by the instrumental analysis conducted in the same manner as in Example 17, the formed polymer was identified with a polycarbonate copolymer comprising 2,2-bis-(4-hydroxyphenyl)propane and 2,2-bis(4-hydroxy-3-isopropylphenyl)propane in a ratio of 1:9.

EXAMPLE 19

Figure 7:
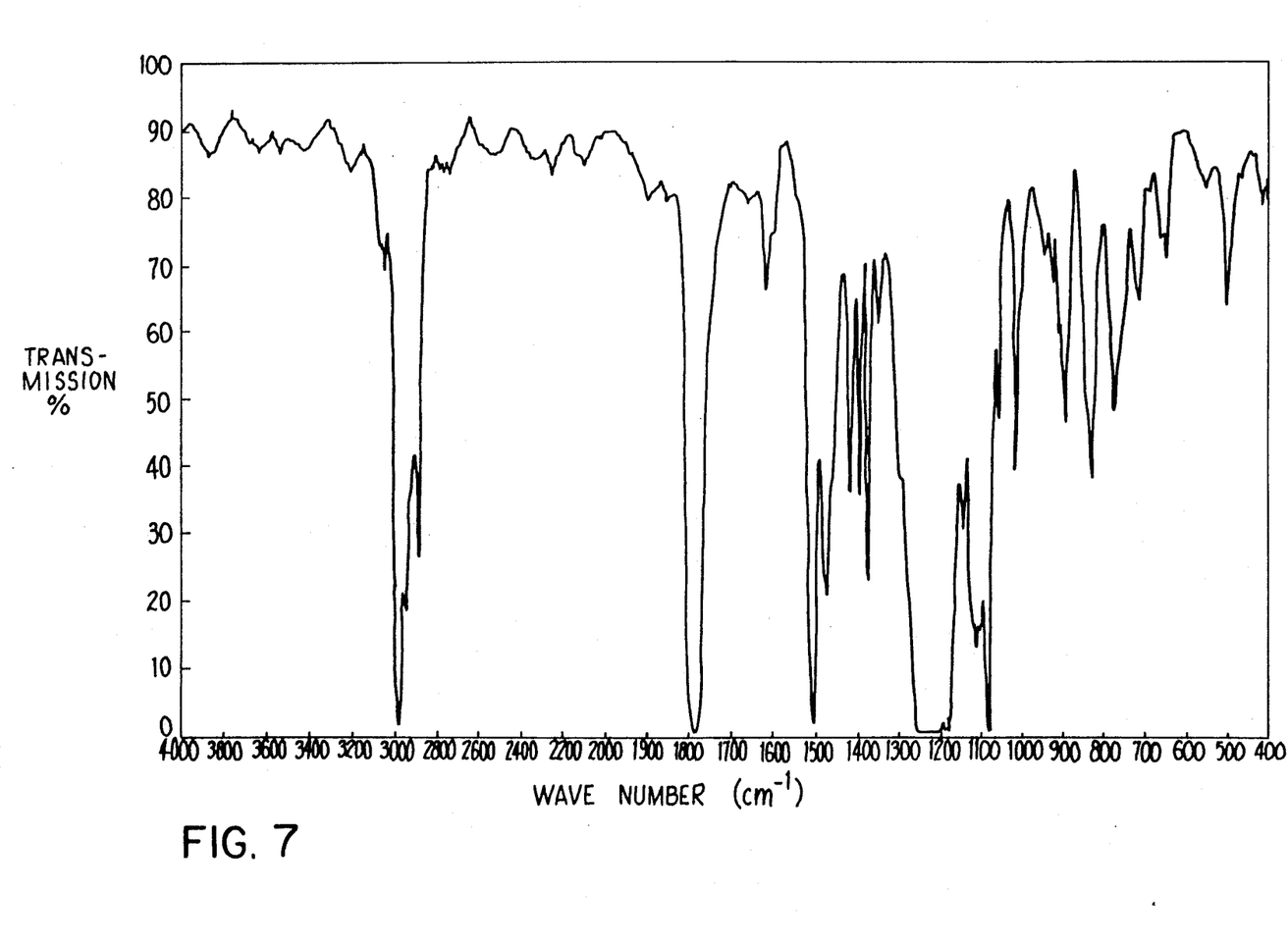
FIGS. 7 and 8 show IR spectrum and NMR spectrum, respectively, of the polymer obtained in Example 19.
Figure 8:
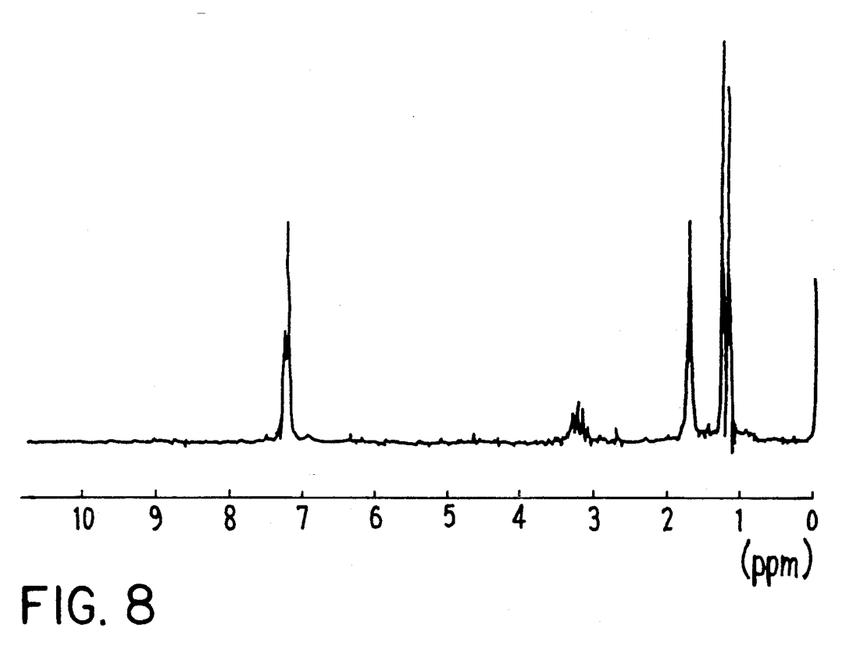

30.72 g, (0.12 mol, 256 parts) of 2,2-bis(4-hydroxy-3-isopropylphenyl)propane and 26.35 g (0.123 mol, 215 parts) of diphenyl carbonate were placed in a 3-l three-necked flask. After repeating degassing and nitrogen purge five times, the mixture was melted at 160° C. in a silicone bath while nitrogen was introduced thereinto. A solution of potassium borohydride (carbonation catalyst) in phenol prepared previously was added to the melt in an amount of 0.5 ml ($10^{-3}$ molar % based on the total amount of the bisphenol fed). After stirring at 160° C. in a nitrogen atmosphere for 30 min, the pressure was reduced to 100 Torr at that temperature in 15 min and the mixture was kept under 100 Torr for additional 15 min. Further the pressure was reduced to 50 Torr at that temperature and the reaction was continued for additional 30 min. The temperature was elevated slowly to 220° C. and the reaction was conducted for 30 min. Then the pressure was reduced to 10 Torr at that temperature and the reaction was conducted for 30 min. The temperature was elevated slowly to 270° C. and the reaction was conducted for 30 min. Further the pressure was reduced to 5 Torr at that temperature and the reaction was conducted for 30 min. Thereafter the postcondensation reaction was conducted at that temperature under 0.1 to 0.3 Torr for 1.5 h. The resulting polymer was taken out and cooled in a nitrogen atmosphere and its solution viscosity was determined using methylene chloride as the solvent at 20° C. The viscosity-average molecular weight $\overline{M}v$ calculated from the solution viscosity was 23,000. In its IR spectrum, a characteristic absorption of a carbonate bond was observed at 1,760 to 1,800 cm$^{-1}$ (FIG. 7). In its $^1$H-NMR spectrum, absorptions of hydrogen in the methyl group of an isopropyl group at 1.22 ppm (doublet), hydrogen in the methyl group of propane at 1.75 ppm, hydrogen in the methine group of an isopropyl group at 3.3 ppm (septet) and a phenyl group at 7.3 ppm were observed (FIG. 8). From the results of the determination with DSC (differential scanning calorimeter), it was found that the glass transition point Tg was 87° C. The photoelasticity constant C was 39 Brewsters ($10^{-12}$ m²/N).

The devices used in the measurement were an IR spectrometer (IR-810; a product of Nippon Bunkô Co.), a $^1$H-NMR device (JNM-MH-100; a product of JEOL, Ltd.) and a DSC [differential scanning calorimeter (Perkin-Elmer 2C)]. The photoelasticity constant was determined with a device made by the present inventors. The photoelasticity constant of the polycarbonate of 2,2-bis(4-hydroxyphenyl)propane as determined with this device was 82 Brewsters. The photoelasticity constant was determined by applying various tensile stresses to test pieces (50 mm × 10 mm × 1 mm) lengthwise, measuring the double refraction, putting the value in the above-mentioned formula (1) and determining the photoelasticity constant from the gradient

EXAMPLE 20

A 500-ml three-necked flask was provided with a stirrer, thermometer, gas-inlet tube and gas-outlet tube. 20 g of 2,2-bis(4-hydroxy-3-isopropylphenyl)propane was dissolved in 200 ml of pyridine. Gaseous phosgene was introduced thereinto under vigorous stirring. This operation was conducted in a powerful draft chamber, since phosgene is virulent.

Phosgene was introduced from a bomb into the flask through an empty gas washing bottle, a gas washing bottle containing paraffin (to count the number of bubbles) and an empty gas washing bottle sequentially. The gas inlet tube was inserted into the flask and placed above the stirrer and the end thereof was widened like a funnel so that it would not be clogged by the formed pyridine salt.

As the gas was introduced into the flask, pyridine hydrochloride was precipitated and the reaction mixture became turbid. The reaction temperature was kept below 30° C. by cooling with water. As the condensation reaction proceeded, the solution became viscous. Phosgene was introduced thereinto until yellow color of phosgene/hydrogen chloride complex no more disappeared. After completion of the reaction, 300 ml of methanol was added to the reaction solution to precipitate the polymer, which was filtered and the filtration residue was dried The polycarbonate thus formed was reprecipitated from methanol to purify the same.

After the purification followed by drying, the solution viscosity of the product was determined using methylene chloride as the solvent at 20° C. The viscosity-average molecular weight $\overline{M}v$ calculated from the solution viscosity was 28,000.

Since the product was analyzed in the same way as shown in Example 19 and the same result as shown in Example 19 was obtained, it was identified with a polycarbonate of 2,2-bis(4-hydroxy-3-isopropylphenyl)propane.

EXAMPLE 21

In a 3-liter three-mouth flask were placed 174 parts by weight (50 mol %) of 4,4'-dihydroxy-2,2,2-triphenylethane, 187 parts by weight (50 mol %) of 2,2-bis-(4-hydroxy-3-isopropylphenyl)propane, and 264 parts of diphenyl carbonate. Deareation and replacement with nitrogen were repeated five times. The reactants were melted in a silicone bath while nitrogen was being introduced into the flask. To the flask was added potassium boron hydride ($10^{-3}$ mol % based on the total amount of phenol charged), a catalyst to form the carbonate linkage, which had previously been dissolved in phenol. Reaction was carried out with stirring under nitrogen at 160° C. for 30 minutes. Reaction was continued with stirring at 160° C. and 100 Torr for 30 minutes. Reaction was further continued at 160° C. and 50 Torr for 60 minutes. The reaction temperature was raised to 220° C. and reaction was continued for 60 minute. Up to this stage of reaction, phenol was distilled away as much as 80% of the theoretical amount. Reaction was continued at 220° C. and 10 Torr for 30 minutes. The reaction temperature was gradually raised to 270° C. and reaction was carried out at 270° C. for 30 minutes. Reaction was continued at 270° C. and 5 Torr for 30 minutes. Up to this stage of reaction, almost all the theoretical amount of phenol was distilled away and the precondensation step was completed. The post-condensation step was carried out at 270° C. and 0.1-0.3 Torr for 2 hours. The reaction product or polymer was discharged and cooled under nitrogen atmosphere. The solution viscosity of the polymer was measured at 20° C. with a 10% aqueous sodium hydroxide solution. The viscosity-average molecular weight calculated from the solution viscosity was $\overline{M}v = 21,000$.

The data obtained with a DSC (differential scanning calorimeter, Perkin Elmer, Model 2C) indicated a glass transition point of Tg=121° C. The photoelasticity constant (measured with an apparatus made by the inventors) was C=45 Brewsters, $10^{-12}$ m²/N. The photoelasticity constant was obtained by substituting the formula (1) above for varied amounts of tensile stress applied in the longitudinal direction of a sample measuring 50×10×1 mm. By the way, the photoelasticity constant of 2,2-bis-(4-hydroxyphenyl)propane was C=82 Brewsters, $10^{-12}$ m²/N.

EXAMPLE 22

In a three-mouth flask equipped with a stirrer, thermometer, gas inlet, and exhaust tube were placed 174 parts by weight of 4,4'-dihydroxy-2,2,2-triphenylethane and 187 parts by weight of 2,2-bis-(4-hydroxy-3-isopropylphenyl)propane), which were dissolved in dichloromethane. To the solution was further added dichloromethane. While being vigorously stirred, phosgene was introduced into the flask through an empty scrubbing bottle, water-filled scrubbing bottle, and empty scrubbing bottle connected one after another from a cylinder. During the introduction of phosgene, the reaction temperature was kept below 25° C. by water cooling. As condensation proceeded, the reaction liquid became viscous. After the reaction, methanol was poured into the reaction liquid, and the resulting precipitate was filtered off and washed with water repeatedly. The thus obtained polycarbonate was dissolved in dichloromethane and reprecipitated with methanol, followed by drying. The solution viscosity of the polycarbonate was measured at 20° C. using dichloromethane as a solvent. The viscosity-average molecular weight calculated from the solution viscosity was $\overline{M}v = 23,000$.

And the glass transition point was Tg=121° C. and the photoelasticity constant was C=45 Brewsters ($10^{-12}$ m²/N).

In the above shown examples, the viscosity-average molecular weight was determined with measurement of an intrinsic viscosity and the below shown formula, corresponding to that of bisphenol-A polycarbonate.

$$[\eta] = 1.11 \times 10^{-4} M^{0.82}$$

[E. Miller & O. Bayer, U.S. Pat. No. 2,999,844 (1961)]

which represents the relationship between the molecular weight M and the intrinsic viscosity $[\eta]$ of bisphenol-A polycarbonate measured at 20° C. using methylene chloride solution.

Application Example to Optical Disk

The polycarbonate obtained in each of Examples 9, 10, 19, 20, 21, and 22 was used to make a recording disk and examined in view of optical recording characteristics.

The polycarbonate was molded into a disk base 130 mm in diameter and 1.2 mm in thickness using an injection molding machine ("Dynamelter", made by Meiki Seisakusho). On this base plate was formed an optomagnetic recording film, 1000 Å thick, using an alloy target of $Tb_{23.5}Fe_{64.2}Co_{12.3}$ (atom %) in a sputtering apparatus (made by Nippon Shinku Co., Ltd.). Using the same sputtering apparatus, the recording film was covered with a protecting film, 1000 Å thick, of inorganic glass disclosed in Japanese Patent Laid-open No. 177449/1985 filed by the present applicant. The performance of the thus obtained optomagnetic disk was evaluated in terms of CN ratio, BER, and the change of CN ratio that takes place after aging at 60° C. and 90% RH. The results are shown in Table 1.

TABLE 1

| Sample No. | Birefringence (Δn single pass) | CN (dB) (note 1) | BER (bit error rate) | Change (%) of CN after 30 days (note 2) |
|---|---|---|---|---|
| Example 9 | 8 | 53 | 5 × 10⁻⁶ | 90 |
| Example 10 | 5 | 55 | 2 × 10⁻⁶ | 95 |
| Example 19 | 4 | 55 | 2 × 10⁻⁶ | 95 |
| Example 20 | 3 | 56 | 1 × 10⁻⁶ | 96 |
| Example 21 | 6 | 55 | 4 × 10⁻⁶ | 94 |
| Example 22 | 4 | 57 | 2 × 10⁻⁶ | 95 |
| Comparative Example (note 3) | 20 | 46 | 5 × 10⁻⁵ | 85 |

Note 1.
CN ratio: Measured at 7 mW of writing power, 1 mW of reading power, 1 MHz of carrier frequency, and 30 kHz of resolution bandwidth.
Note 2.
Change (%) of CN: Expressed by the ratio of the initial CN ratio to the CN ratio measured after 30 days of aging at 60° C. and 90% RH.
Note 3.
Comparative Example: An optomagnetic disk prepared in the same manner as mentioned above from known polycarbonate (AD-5503, a product of Teijin Kasei Co., Ltd.).

It is noted from Table 1 that the polycarbonate copolymer of this invention has a greatly improved CN ratio on account of the reduced birefringence and that it has also good durability.

What is claimed is:

1. An optical information recording disk comprising a substrate made of an aromatic polycarbonate obtained from (1) 2,2-bis(4-hydroxy-3-isopropylphenyl)propane, (2) 2,2-bis(4-hydroxyphenyl)propane and 2,2-bis(4-hydroxy-3-isopropylphenyl)-propane or (3) 4,4'-dihydroxy-2,2,2-triphenylethane and 2,2-bis(4-hydroxy-3-isopropylphenyl)propane through a carbonate linkage; and a recording layer coated on said substrate, said polycarbonate having a viscosity-average molecular weight of from 23,000 to 100,000.

2. An optical information recording disk as claimed in claim 1 in which said substrate consists essentially of a homopolymer of 2,2-bis(4-hydroxy-3-isopropylphenyl)-propane.

3. An optical information recording disk as claimed in claim 1 in which said substrate consists essentially of a copolymer of from 99 to 1 mole percent of recurring units of the formula and correspondingly, from 1 to 99 mole percent of recurring units of the formula 4. An optical information recording disk as claimed in claim 3 in which said aromatic polycarbonate has a glass transition temperature of from 85° C. to 139° C., a viscosity average molecular weight of from 25,000 to 35,000, and a photoelastic coefficient of from 35 to 74 Brewsters.

5. An optical information recording disk according to claim 1 in which said substrate consists essentially of a copolymer of from 97 to 3 mole percent of recurring units of the formula and, correspondingly, from 3 to 97 mole percent of recurring units of the formula 6. An optical information recording disk comprising a substrate made of an aromatic polycarbonate obtained from (1) 2,2-bis(4-hydroxy-3-isopropylphenyl)propane, 2) 2,2-bis(4-hydroxyphenyl)propane and 2,2-bis(4-hydroxy-3-isopropylphenyl)-propane or (3) 4,4'-dihydroxy-2,2,2-triphenylethane and 2,2-bis(4-hydroxy-3-isopropylphenyl)propane through a carbonate linkage; and a recording layer coated on said substrate, said aromatic polycarbonate containing at least 50 molar percent of a moiety obtained from 2,2-bis(4-hydroxy-3-isopropylphenyl)propane and having a viscosity-average molecular weight of from 16,000 to 100,000.

7. An optical information recording disk as claimed in claim 6, in which said aromatic polycarbonate has a viscosity-average molecular weight of 16,000 to 50,000.

8. An optical information recording disk comprising a substrate consisting of an aromatic polycarbonate homopolymer obtained from 2,2-bis(4-hydroxy-3-isopropylphenyl) propane through a carbonate linkage; and a recording layer coated on said substrate, said aromatic polycarbonate homopolymer having a viscosity-average molecular weight of from 16,000 to 100,000.

9. An optical information recording disk comprising a substrate of an aromatic polycarbonate copolymer obtained from 2,2-bis(4-hydroxy-3-isopropylphenyl)propane and 4,4'-dihydroxy-2,2,2-triphenyl ethane through a carbonate linkage; and a recording layer coated on said substrate.

10. An optical information recording disk comprising a substrate made of an aromatic polycarbonate obtained from (1) 2,2-bis(4-hydroxy-3-isopropylphenyl)propane, (2) 2,2-bis(4-hydroxyphenyl)propane and 2,2-bis(4-hydroxy-3-isopropylphenyl)propane or (3) 4,4'-dihydroxy-2,2,2-triphenylethane and 2,2-bis(4-hydroxy-3-isopropylphenyl)propane through a carbonate linkage; and a recording layer coated on said substrate, said polycarbonate having a viscosity-average molecular weight of from 16,000 to 100,000.

* * * * *

UNITED STATES PATENT AND TRADEMARK OFFICE
CERTIFICATE OF CORRECTION

PATENT NO. : 5 173 347

DATED : December 22, 1992

INVENTOR(S) : Tatsuya KANNO et al

It is certified that error appears in the above-identified patent and that said Letters Patent is hereby corrected as shown below:

Column 22, line 11; delete "and, correspondingly,"

Signed and Sealed this

Fourth Day of January, 1994

Attest:

BRUCE LEHMAN

*Attesting Officer*    *Commissioner of Patents and Trademarks*